United States Patent [19]

Cosman et al.

[11] Patent Number: 4,866,388

[45] Date of Patent: Sep. 12, 1989

[54] SYSTEM AND METHOD WITH PASSIVE RESONANT CIRCUIT MARKERS FOR LOCATING BURIED ELECTRICAL CONDUCTORS

[75] Inventors: Armond D. Cosman, Austin; Joe T. Minarovic, Georgetown, both of Tex.

[73] Assignee: Minnesota Mining and Manufacturing Company, St. Paul, Minn.

[21] Appl. No.: 193,250

[22] Filed: May 11, 1988

[51] Int. Cl.$^4$ .................. G01V 3/11; G01V 3/165
[52] U.S. Cl. ..................... 324/326; 324/67; 340/551
[58] Field of Search ............ 324/67, 326–329, 324/334, 345; 340/551, 552, 686; 361/179, 180

[56] References Cited

U.S. PATENT DOCUMENTS

| | | | |
|---|---|---|---|
| 2,148,389 | 2/1939 | Yonkers | 324/67 |
| 2,167,490 | 7/1939 | Ryan | 324/67 |
| 4,119,908 | 10/1978 | Cosman et al. | 324/326 |
| 4,767,237 | 8/1988 | Cosman et al. | 324/326 X |

Primary Examiner—Gerard R. Strecker
Attorney, Agent, or Firm—Donald M. Sell; Walter N. Kirn; Robert L. Marben

[57] ABSTRACT

A method and system for determining the location of a first insulated conductor and a plurality of similar branch conductors that are branches of the first conductor, but without ohmic contact being made with the first conductors. A passive marker having a resonant circuit that includes an inductor and capacitor is provided for each of the branch conductors and is positioned to be inductively coupled to the first conductor and the associated branch conductor. The first conductor is a part of a closed loop circuit and each branch conductor is a part of separate closed loop circuits. An alternating signal applied to any one of the closed loop circuits is inductively transmitted to each of the other closed loops that is inductively coupled to a passive marker having a resonant frequency equal to the frequency of the alternating signal. Flow of alternating signals in the closed loops and passive markers cause a detectable electromagnetic signal to be produced to identify the location of the first conductor, branch conductors and passive markers when conducting the alternating signals.

6 Claims, 3 Drawing Sheets

4,866,388

SYSTEM AND METHOD WITH PASSIVE RESONANT CIRCUIT MARKERS FOR LOCATING BURIED ELECTRICAL CONDUCTORS

TECHNICAL FIELD

The invention presented herein relates to a system and method for locating buried, insulated, electrical conductors positioned near underground supply lines.

BACKGROUND ART

Telephone and pipeline companies, electric, water and gas utilities and others have need for locating and identifying underground lines and subterranean installations to service and maintain them. A single tracing wire is sometimes buried with a utility line wherein the earth is used as a return path. An alternating current signal source is applied between the wire and ground or inductively coupled to the wire when the wire is to be traced. An electromagnetic or "H" field is produced along the wire by the alternating current flow established in the wire. This "H" field is detected by a receiver carried by an operator above the wire to trace the wire. U.S. Pat. No. 4,119,908 discloses a method for tracing utility lines and locating other buried objects wherein a single, buried, tracing wire is provided in the vicinity of the buried utility line and passive markers, which contain a resonant circuit, are disposed adjacent and along side the tracing wire at each point where a particular object or structure is buried. An alternating current signal is applied directly or by induction to tracing wire allowing the tracing wire to be traced as indicated above. A receiver, when swung to and fro laterally of the energized tracing wire, will normally produce an output having a peak-no-peak sequence. The resonant circuit of each of the passive markers, which is inductively coupled to the tracing wire, is tuned to the frequency of the alternating current signal flowing in the tracing wire so that the output of the receiver presents a peak when the receiver reaches a point where a null should be produced to provide a precise location of the passive marker.

U.S. patent application, Ser. No. 153,513, filed Feb. 8, 1988, which is a continuation of U.S. patent application Ser. No. 900,453, filed Aug. 26, 1986, by the inventors which issued as U.S. Pat. No. 4,767,237 on Aug. 30, 1988, discloses the use of more than one insulated conductor which are carried by a marking tape. Two conductors on the marking tape are terminated at one end with the alternating signal source connected between the conductors at the other end to provide a balance circuit as opposed to the single ended circuit that is established when a ground return is used with a single conductor. Passive markers are positioned along and between the two conductors where desired with the resonant circuit of each marker inductively coupled to each of the conductors. The two conductor balanced circuit arrangement causes both the outgoing and return current to inductively energize the passive markers to produce an electromagnetic or "H" field.

The prior art arrangement of U.S. Pat. No. 4,119,908, supra, that has been described, provide for the locating of a buried conductor(s) which may be positioned adjacent to and along a buried utility or supply line, such as a telephone cable, gas or water line, to establish the location of the buried utility line and the point where lateral or branch lines to the main line. A logical extension of such arrangement for establishing the path of a buried utility or supply line that branches from a main line calls for the use of a branch conductor for each branch line which would be connected by ohmic contact with the main tracing conductor. Once the point at which a branch tracing conductor is located, the path of the branch conductor can be determined. This approach requires cutting of the main tracing conductor at each branch point and splicing of branch tracing conductor to the main tracing conductor. Due to the placement of the locating conductors beneath the surface of the earth and the circumstances surrounding such placement, it is difficult and time consuming to provide for a good and long lasting physical or ohmic connection of each branch conductor to the locating conductor for a utility line or the like. All of branch or lateral tracing conductors are energized when a signal is presented to the main tracing conductor causing the "H" field around the main tracing wire to be distorted causing erroneous path information to be generated. In addition, the use of lateral conductors, which make ohmic contact with the conductor for a main utility line, limits the monitoring capability that is provided when a marking tape of the type disclosed in the aforementioned continuation patent application is utilized.

SUMMARY OF THE INVENTION

The invention presented herein provides a practical and effective solution to the problem of locating utility lines which are lateral or branches of a main line. Such solution, while it uses branch or lateral tracing conductors, does not require ohmic contact to be made between the main tracing conductor and each branch tracing conductor. The invention encompasses a method and system for determining the location of a first insulated, electrical conductor that is placed above and along a main utility line plus the location of a plurality of insulated, electrical conductors, each of which is positioned above and along a different branch line of the main utility line with each of the plurality of conductors having a portion near the first conductor. The method and system includes (1) providing the plurality of conductors without ohmic contact being made to the first conductor; (2) providing a plurality of passive markers, each having an inductor and a capacitor arranged to provide a resonant circuit; (3) positioning a different one of the plurality of passive markers with each of the plurality of electrical conductors and the first electrical conductor for inductively coupling the first electrical conductor with each of the plurality of electrical conductors; (4) establishing the first conductor as a part of a closed loop circuit; (5) establishing a plurality of closed loop circuits, each including a different one of the plurality of conductors; (6) providing a single source of alternating signals; (7) applying the alternating signals from the signal source to one of the closed loop circuits whereby the signals are inductively transmitted from such closed loop circuit to the remaining closed loop circuits dependent upon the frequency of the alternating signals and the resonant frequency of each of the resonant circuits; (8) providing a receiver capable of receiving a signal at the frequency of the signals supplied by the signal source and communicating to an operator the strength of the received signal; and (9) moving the receiver laterally of any one of the closed loop circuits carrying the alternating signals and receiving electromagnetic signals produced when such closed loop circuit is carrying an alternating signals to establish the location of each closed loop circuit. Since the resonant frequency of a resonant circuit for a passive marker of the system and the frequency of the applied alternating signal determines whether a branch closed loop circuit will receive the signals, the system of the invention makes frequency selective tracing of branch tracing conductors possible which could not be done with the prior art system.

The closed loop circuits that are utilized in the invention can be all balanced circuits or all single ended circuits or both. A balanced circuit uses two conductors that are terminated at one end by direct connection or via an impedance to make the closed loop while a single ended circuit uses one conductor that is grounded at one end with ground providing a return path to complete the loop.

BRIEF DESCRIPTION OF THE DRAWINGS

The novel feature and advantages of the present invention will become more apparent to those skilled in the art upon consideration of the following detailed description which refers to the accompanying drawings wherein.

DETAILED DESCRIPTION

Figure 5:
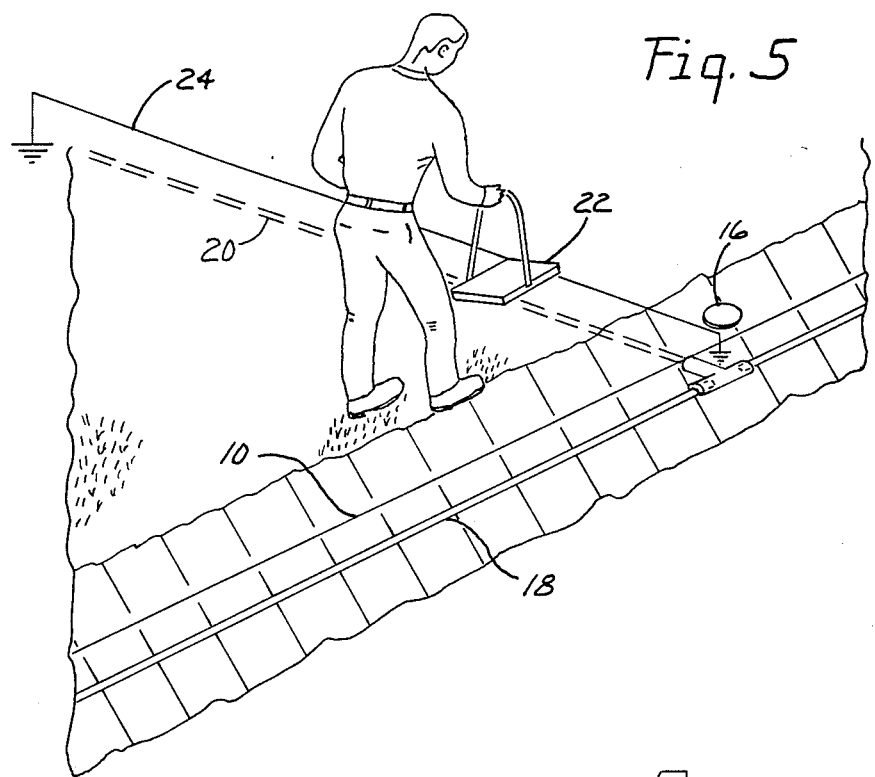
FIG. 5 shows the use of a receiver with the circuitry of the invention.
Figure 1:
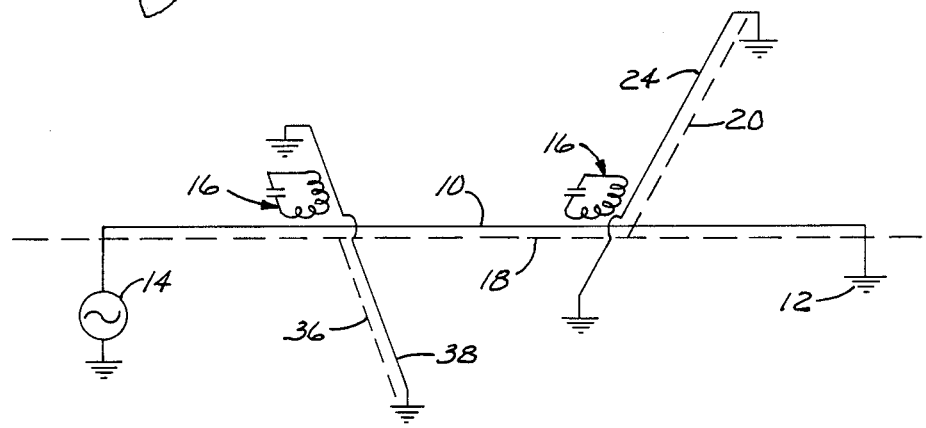
FIG. 1 is a schematic of the electrical circuitry for the invention wherein single ended circuits are used.

Referring to FIGS. 1 and 5 of the drawings, an electrical schematic of circuitry is shown that forms a part of the system of the invention presented herein. The system embodying the invention includes a first, insulated, electrical conductor 10 that when used with a buried utility installation is buried and located above and along such an installation, such as a water line, telephone cable, fiber optics cable, or electric power line and the like as indicated at 18 in FIG. 5. In FIG. 1, a dotted line is used to indicate the utility line 18. If it is desired that the system provide for the location of each point where a lateral or branch line 20 is connected to the main buried utility line 18, a passive marker 16 is buried adjacent the conductor 10 above the point where a branch line 20 connects to the main line 18. The passive marker 16 is a known structure that includes an inductor-capacitor combination tuned to be resonant at a predetermined frequency, as for example, 100 kHz and is positioned with a suitably sealed case. The inductor portion is a coil of wire of ring shaped configuration with the ends of the wire connected together via a capacitor. The passive marker 16 is disposed to lie in a substantially horizontal plane alongside and as close to the conductor 10 as is conveniently possible to provide inductive coupling between the conductor 10 and the circuit of the passive marker. Referring to Figure 1, the electrical conductor 10 is grounded at one end as shown at 12.

When it is desired that the path of conductor 10 be determined to locate the utility line 18 with which it is associated and to locate each passive marker 16, the conductor 10 is energized by signals of a desired predetermined frequency, for example, 100 kHz corresponding to the resonant frequency of the passive marker 16. This is done by using a signal source, such as transmitter 14 which is preferably conductively coupled to the conductor 10 as shown in FIG. 1, wherein one output of the transmitter 14 is connected to conductor 10 with the other output connected to ground.

The system embodying the invention requires the use of a receiver 22, which is shown in FIG. 5. The receiver 22 is portable and is of a conventional type having an antenna loop and designed to receive with requisite sensitivity a signal of the frequency transmitted by the transmitter 14 with an audible signal being provided by a speaker when a signal is received. Receipt of a signal is also made evident by a meter provided at the receiver. The receiver 12 is preferably in a form that can be conveniently swung back and forth laterally by the operator as he walks along the path of the conductor 10 with the antenna loop being generally horizontally disposed.

A second branch line 36 which connects to the main line 18 is shown in FIG. 1 with another passive marker 16 similarly buried adjacent the conductor 10 and above the point where the branch line 36 connects to the main line 18.

The detailed description of the system described to this point is in accordance with known prior art systems, such as that described in U.S. Pat. No. 4,119,908. In operation, the transmitter 14 is connected to the conductor 10, as described above, and is turned on while the operator walks along the conductor 10 path, swinging the receiver 22 laterally as he proceeds (the receiver, of course, having been turned on and the sensitivity appropriately adjusted). The transmitter output causes current to flow in the conductor 10 to generate an electromagnetic or "H" field which extends concentrically along the conductor 10 with the conductor being the field central axis. The conductors of each passive marker element 16 will be cut by the electromagnetic field along the conductor 10, thus causing an electromagnetic or "H" field also to be generated by each passive marker element. The "H" field generated by the respective passive marker element will have the same frequency as the field about conductor 10, but will have a different orientation.

If the operator swings the receiver 22 laterally of the conductor 10, and an equal distance on either side thereof, the signal seen by the receiver 22 peaks at the extremes of the swing and nulls at the mean or center of the swing. These peaks and nulls are communicated to the operator either by an audible tone via a speaker or visually via a meter. In this manner, the operator can readily follow the conductor 10 path. When a passive marker element 16 is encountered, the pattern of the field signal as detected by the receiver 22 is altered such that a signal now appears where there would otherwise be a null. By increasing the receiver sensitivity and by observing the peak on the meter when the receiver is centered over the conductor 10 the particular passive marker element 16 can be precisely located.

Such prior known method and system as just described while serving to locate the point where a later or branch line 20 connects to a main utility line 18, does not provide a method and system for locating the path of a lateral or branch line 20 from the main line 10. As pointed out in the discussion of the background art, it would be logical to extend such prior known method and system to provide for the location of the path of a lateral or branch line from the main line 10. This would be done by the use of a tracing wire for each branch line with each such tracing wire making ohmic contact with the main tracing conductor. Once the point is found when a branch line connects with the main line in accordance with the described prior known method, the tracing wire for the branch line can be traced in the same manner as for the tracing conductor for the main line. The required ohmic contact between a branch tracing conductor and the main tracing conductor would be made by cutting the main tracing conductor and splicing in the branch tracing conductor. The disadvantages associated with such an approach for locating the path of a branch or lateral line are discussed above with respect to the background art.

The invention presented herein provides a reliable and easily implemented solution to the problem of locating the path of a lateral or branch line 20 that connects to a main utility line 10. Using the system and method that has been described to this point, an insulated, electrical conductor 24 is buried and is located above and along the lateral lines 20 (FIG. 5) and extends from the passive marker 16, which is used to establish the point where a lateral line 20 connects to a main utility line, to the end of the lateral line, which for example, may be a meter for the utility product that is provided. Unlike the system suggested by the prior art, the lateral tracing conductor 24 does not make ohmic connection with the main tracing conductor 10. The electrical conductor 24 and the passive marker 16 are positioned so the conductor 24 is inductively coupled to the marker 16 with the inductive coupling between marker 16 and conductor 10, as has been described, being retained. With this arrangement the passive marker 16 not only functions, when there is an alternating signal supplied to the conductor 10, to produce a detectable signal at the marker due to the current induced in the coil of the marker, but also serves to function as a transformer to cause a current flow in the conductor 24 when both ends of the conductor 24 are grounded. The presence of a buried conductor 24 in association with a lateral utility line 20 also provides an alternative way for providing alternating signal to the system. This can be done by connecting the transmitter 14 between the end of conductor 24 away from the conductor 10 and ground. This end of conductor 24 is normally available as it serves as a tracing wire which in practice is brought up above ground at the end of the conductor 24 away from conductor 10. With such an arrangement, current flow in conductor 24 due to operation of the transmitter 14 will induce current flow in conductor 10 due to the inductive or transformer coupling provided by the resonant circuit of the passive marker 16 with the conductor 10 and 24.

The transmitter 14 is preferably conductively coupled to the underground conductor 10 or a lateral conductor 20 so as to achieve a high field energy level. However, in some instances there may not be convenient physical access to the underground conductor, in which case the transmitter may be inductively coupled. A selector control on the transmitter 14 may be provided to accommodate either mode of operation.

An electrical conductor 38 is provided for branch line 36 in the same manner as described for conductor 24 in relation to branch line 20 and functions in the same manner as conductor 24.

Figure 2:
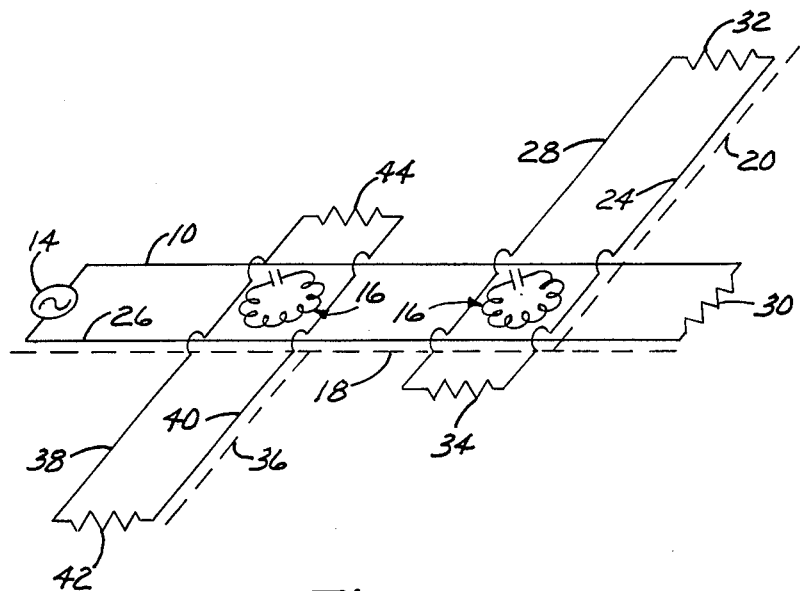
FIG. 2 illustrates the electrical circuitry for the invention wherein all of the closed loop circuits are balanced circuits.

The embodiment of the invention described in connection with FIGS. 1 and 5 involves the use of only unbalanced or single ended circuits for conductors 10 and 24 in that a ground return is used for such circuits. A preferred embodiment of the invention is to use a conductor in place of the ground return path that is provided in the circuits of FIGS. 1 and 5. Using two conductors provides for control of the circuit loop resistance and also allows the return path current to be coupled to the passive markers to provide for a greater "H" signal along the conductors and at the passive markers since outgoing and return path currents will be effective to generate "H" signals. Such an embodiment is shown in FIG. 2 wherein a conductor 26 provides the return path for current flow in conductor 10 and conductors 28 and 40 provide a return path for the current flow in conductors 24 and 36 associated with the branch or lateral utility lines 20 and 36, respectively. As in FIG. 1, the utility lines are shown by dotted lines to avoid confusion with the electrical conductors of the system. The paired conductors 10 and 26; 20 and 28 and 38 and 40 provide three balanced signal transmission lines. While it is possible to connect them together directly at their ends, it is preferred that they be terminated with a resistance equal to the impedance of the transmission lines. Resistor 30 is used as a terminating impedance for one end of conductors 10 and 26, while resistors 32 and 34 are used for terminating the two ends of conductors 20 and 28 to complete a closed loop with resistors 42 and 44 being used to complete a closed loop for conductors 38 and 40. Transmitter 14 is shown connected between the conductors 10 and 26 for energizing the circuits with an alternating current having a frequency equal to the resonant frequency of the passive marker 16. The passive marker 16 for the embodiment of FIG. 2 is positioned so its resonant circuit is horizontally disposed, as in the case of FIG. 1, and is positioned so all the conductors 10, 26, 24 and 28 are inductively coupled to the winding providing the inductor in marker 16. The marker will then respond to current flow in conductors 10 and 26 and by the current induced in the resonant circuit of the marker, induce current flow in conductors 20 and 28. The passive marker 16 for conductors 10, 26, 38 and 40 is similarly positioned to function in a similar manner.

The technique involved in the use of receiver 22 with the system shown in FIGS. 1 and 5 is applicable to the system of FIG. 2 for establishing the path for conductors 10 and 26 and detecting the location of the markers 16. The paths for conductors 24 and 28 and conductors 38 and 40 are then determined as for conductors 10 and 26 after the associated marker 16 is located.

As in the system described in connection with FIGS. 1 and FIGS. 5, the transmitter 14 can be connected between conductors 20 and 28 to energize the system. This, of course, requires removal of resistor 32 and the connection together of conductors 10 and 26 where the transmitter 14 is shown connected in FIG. 2. Such connection can be direct or via a terminating impedances, such as a resistor similar to resistor 30. The transmitter 14 can also be connected for energization of the system to conductors 38 and 40 in a similar manner.

Figure 3:
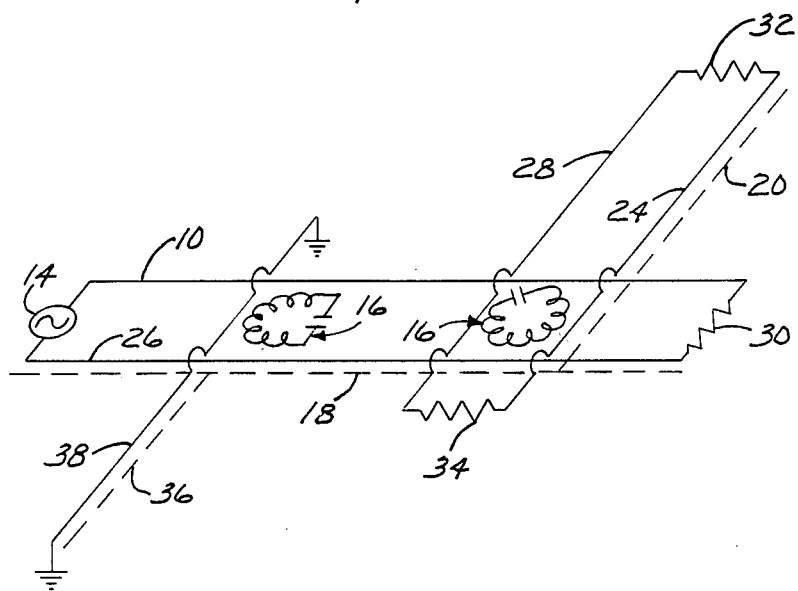
FIG. 3 illustrates the electrical circuitry for the invention wherein the closed loop circuit used with a main utility line is a balanced circuit with the closed loop circuits for the branch utility lines being either single ended or balanced circuits.
Figure 4:
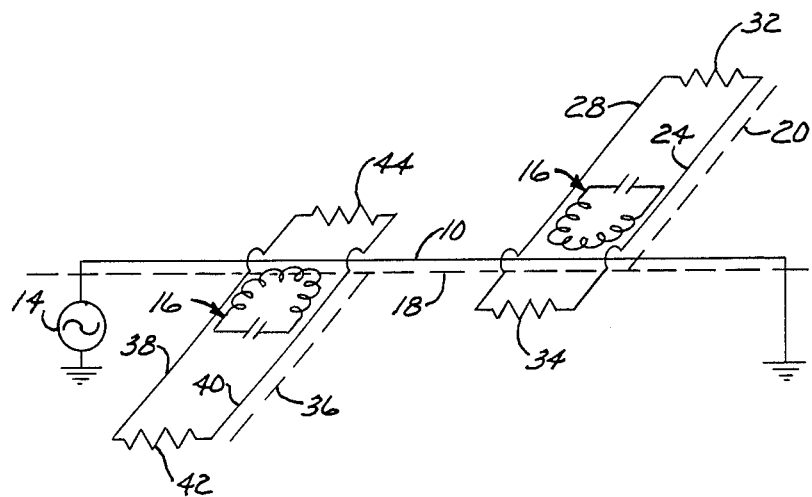
FIG. 4 is similar to FIG. 2, but with a single ended closed loop circuit used with the main utility line instead of a balanced closed loop circuit.

The systems shown in FIGS. 3 and 4 are shown to illustrate arrangements wherein both balanced and single ended circuits can be used. As has been the case for FIGS. 1, 2 and 5 wherein like reference numbers have been used for designating for like or similar elements, such reference numerals are also used for FIGS. 3 and 4. In the case of FIG. 3, a balanced circuit is used with the main utility line 18, as in FIG. 2, while a balance circuit is used for a lateral line 20, as in FIG. 2, with a single ended circuit used for lateral utility line 36. In the case of FIG. 4, a single ended circuit is used with the main utility line 18 as in FIG. 1, while balanced circuits for lateral line 20 and 36 are used, as in FIG. 2. A passive marker 16 is supplied for use at each of the points where the lateral utility lines 20 and 36 connect with the main utility line 18 and are positioned for inductive coupling with the conductors associated with the main and lateral lines as heretofore described.

Since the passive markers 16 can be used for locating other buried structures along a main utility line, a passive marker having a unique resonant frequency for a particular location or for each different type of location or structure can be used. For example, a resonant frequency of 100 KHz might be used for locating the connection of lateral lines to the main lines and 120 KHz for load coils, if the utility line is a telephone cable. Similarly, a different frequency could be used for each lateral connection to a main line.

It is convenient to have the tracing conductors carried on a marking tape. The marking tape will serve as a convenient way for placing the conductors under ground and will serve to warn an excavator of the presence of a utility line before an excavation effort reaches the level at which the utility line is buried. The two conductors carried by the marking tape are also usable to monitor the condition of the conductors to detect a break that may occur, since as by an excavation conducted along the utility line.

It should also be appreciated that while the balanced circuits have been shown in the various figures using physically spaced apart conductors, a twisted pair of conductors can also be used with the pairs separated at points where passive markers are positioned to obtain the desired inductive coupling between the conductors and the resonant circuit of the marker.

While the invention has been described in connection with location of buried conductors, it should be appreciated that the invention is broader in scope in that it is applicable also for locating any conductors as described which cannot be visibly traced. For example, the first conductor of a system and the plurality of conductors that extend from the first conductor without ohmic contact being made to the first conductor may be located in the walls and/or floors of a building and serve as tracing wires for certain structures or elements located within the walls and/or floors of a building.

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

We claim:

1. A method for determining the concealed location of any of a first, insulated electrical conductor and a plurality of insulated, electrical conductors, each of which extends from the first conductor at an angle and with a portion near the first conductor comprising the steps of:

a. providing said plurality of electrical conductors without ohmic contact being made to said first conductor;
   b. providing a plurality of passive markers, each having an inductor and a capacitor arranged to provide a resonant circuit;
   c. positioning said plurality of passive markers so each of the plurality of electrical conductors and the first electrical conductor are inductively coupled via a different one of said plurality of passive markers;
   d. establishing the first conductor as a part of a closed loop circuit;
   e. establishing a plurality of closed loop circuits, each including a different one of the plurality of conductors;
   f. providing a signal source of alternating signals;
   g. applying said alternating signals from said signal source to one of said closed loop circuits whereby said signals are inductively transmitted from said one of said closed loop circuits to the remaining closed loop circuits dependent upon the frequency of said alternating signals and the resonant frequency of each of said resonant circuits;
   h. providing a receiver capable of receiving a signal at the frequency of the signals supplied by said signal source and communicating to an operator the strength of the received signal;
   i. moving the receiver laterally of any one of said closed loop circuits carrying said alternating signals and receiving electromagnetic signals produced when such closed loop circuit is carrying said alternating signals to establish the location of such closed loop circuit.

2. A method according to claim 1 wherein said signal source is physically connected to said one of said closed loop circuits at step "g" for applying said alternating signals from said signal source to said one of said closed loop circuits.

3. A method according to claim 1 wherein said signal source is inductively coupled to said one of said closed loop circuits at step "g" for applying said alternating signals from said signal source to said one of said closed loop circuits.

4. A method according to claim 1 wherein said closed loop circuits can be either balanced or single ended circuits.

5. A system having circuitry for the conduction of alternating signals applied to the circuitry for determining the concealed location of any of a first insulated electrical conductor and a plurality of insulated, electrical conductors, each of which extends from the first conductor at an angle and with a portion near the first conductor comprising:

a. a plurality of passive markers, each having an inductor and a capacitor arranged to provide a resonant circuit, said plurality of passive markers positioned so each of the plurality of electrical conductors and the first electrical conductor are inductively coupled via a different one of said plurality of passive markers, none of said plurality of electrical conductors making ohmic contact with the first conductor;
   b. a closed loop circuit having the first conductor as a part thereof; and
   c. a plurality of closed loop circuits, each including a different one of the plurality of conductors whereby alternating signals applied to one of said closed loop circuits are inductively transmitted from said one of said closed loop circuits to the remaining closed loop circuits dependent upon the frequency of said alternating signals and the resonant frequency of each of said resonant circuits to cause a detectable electro-magnetic signal to be products to identify the location of the first conductor, and any of the plurality of conductors of said passive markers when conducting the alternating signals.

6. A system according to claim 5 wherein said closed loop circuits can be either balanced or single ended circuits.

* * * * *

UNITED STATES PATENT AND TRADEMARK OFFICE
CERTIFICATE OF CORRECTION

PATENT NO. : 4,866,388
DATED     : September 12, 1989
INVENTOR(S) : Armond D. Cosman and Joe T. Minarovic It is certified that error appears in the above-identified patent and that said Letters Patent is hereby corrected as shown below:

Column 1, line 31, after "to" add --the--.

Column 1, line 62, correct "provide" to --provides--.

Column 1, line 67, after "lines" insert --are connected--.

Column 2, line 68, correct "signals" to --signal--.

Column 4, line 66, correct "later" to --lateral--.

Column 10, line 1, correct "of" third occurrence to --or--.

Signed and Sealed this

Fourteenth Day of August, 1990

Attest:

HARRY F. MANBECK, JR.

*Attesting Officer*     *Commissioner of Patents and Trademarks*